United States Patent
Lessing

(10) Patent No.: US 8,682,360 B2
(45) Date of Patent: Mar. 25, 2014

(54) METHOD AND COMMUNICATION SYSTEM FOR TRANSFERRING MESSAGES CONTAINING AUDIO AND/OR VOICE INFORMATION

(75) Inventor: Simon Lessing, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 527 days.

(21) Appl. No.: 11/816,012

(22) PCT Filed: Dec. 13, 2005

(86) PCT No.: PCT/EP2005/013387
§ 371 (c)(1),
(2), (4) Date: Aug. 10, 2007

(87) PCT Pub. No.: WO2006/087026
PCT Pub. Date: Aug. 24, 2006

(65) Prior Publication Data
US 2008/0064373 A1    Mar. 13, 2008

Related U.S. Application Data

(60) Provisional application No. 60/657,975, filed on Mar. 2, 2005.

(30) Foreign Application Priority Data

Feb. 17, 2005    (EP) .................................... 05003391

(51) Int. Cl.
*H04W 4/00*    (2009.01)
*H04B 15/00*    (2006.01)
*H04M 11/00*    (2006.01)
*H04M 1/725*    (2006.01)

(52) U.S. Cl.
USPC ......... 455/466; 455/518; 455/412.1; 455/405

(58) Field of Classification Search
USPC ........................................... 455/466
See application file for complete search history.

(56) References Cited

U.S. PATENT DOCUMENTS 5,717,741 A * 2/1998 Yue et al. ................... 379/88.12
7,218,919 B2    5/2007 Vaananen
(Continued)

FOREIGN PATENT DOCUMENTS

CN        1468495        1/2004
EP        1 014 663      6/2000
(Continued)

OTHER PUBLICATIONS

International Search Report for corresponding Application No. PCT/EP2005/013387 mailed Feb. 13, 2006.
(Continued)

*Primary Examiner* — Lester Kincaid
*Assistant Examiner* — Andy Gu
(74) *Attorney, Agent, or Firm* — Renner, Otto, Boisselle & Sklar, LLP

(57) ABSTRACT

In a method for transferring a message containing audio and/or voice information from a transmitting communication terminal (20) to a receiving communication terminal (30), said message is depending on a setting of said receiving communication terminal (30) either directly played back at said receiving communication terminal (30) or temporarily stored and played back at a later time point. The user of the receiving communication terminal (30) is thus free to decide whether the communication is direct or asynchronous.

16 Claims, 2 Drawing Sheets

(56) References Cited

U.S. PATENT DOCUMENTS

| | | | |
|---|---|---|---|
| 7,248,864 B1* | 7/2007 | Robertson et al. | 455/417 |
| 2005/0095981 A1* | 5/2005 | Benco | 455/3.06 |
| 2005/0114533 A1* | 5/2005 | Hullfish et al. | 709/230 |
| 2005/0164681 A1* | 7/2005 | Jenkins et al. | 455/412.1 |
| 2005/0250476 A1* | 11/2005 | Worger et al. | 455/412.1 |

FOREIGN PATENT DOCUMENTS

| | | |
|---|---|---|
| EP | 1 432 219 | 6/2004 |
| JP | 2004-507944 | 3/2004 |
| JP | 2004/507944 | 11/2004 |
| WO | 02/17650 | 2/2002 |
| WO | 02/17658 A1 | 2/2002 |
| WO | WO2004/014089 | 2/2004 |
| WO | 2004/054220 | 6/2004 |
| WO | WO2004/095821 | 11/2004 |

OTHER PUBLICATIONS

Porat C.; "Messaging MIT GPRS"; Funkschau, Weka-Fachzeitschr. Verlag, Poing, DE; vol. 74, No. 20; Sep. 2001; pp. 20-23; XP001077925.
Form PCT/ISA/237.

* cited by examiner

METHOD AND COMMUNICATION SYSTEM FOR TRANSFERRING MESSAGES CONTAINING AUDIO AND/OR VOICE INFORMATION

This application is a national phase of International Application No. PCT/EP2005/013387 filed on Dec. 13, 2005 and published in the English language, which claims priority to US 60/657,975 filed on Mar. 2, 2005 and EP 05003391.9 filed on Feb. 17, 2005, which are hereby incorporated herein by reference.

TECHNICAL FIELD OF THE INVENTION

The present invention relates to a method for transferring a message containing audio and/or voice information from a transmitting communication terminal to a receiving communication terminal. The present invention further relates to a communication terminal for use in such a method as well as to a communication system.

DESCRIPTION OF RELATED ART

With the development of different kinds of communication systems in the past, a plurality of different ways for communicating has become available. Although a direct or face-to-face communication is traditionally still seen as the most efficient and therefore best way for communicating between two or more persons, other ways of communicating have become more and more popular.

One example for a communication method whose success was completely unexpected is the well-known Short Message Service (SMS). What some technicians thought was just a gimmick for business men ten years ago has today surfaced as one of the biggest money makers for communication operators around the globe. This is even more surprising since the possibilities for transferring information by use of an SMS message are very limited. However, the limitation of 160 characters per SMS message has to some extent been seen as something positive since there is no need or space for politeness. The same seems to be true for the asynchronous nature of an SMS communication. While in a face-to-face communication one is usually obliged to reply directly, SMS has the power of being less direct in timing. By using an SMS message, the originator of the message is not really sure when he will get a reply. This means on the other hand that the receiver of such a message does not feel obligated to immediately write an answer like she or he would have to do in a phone call or a video call. This observation seems to be in line with reports from the United States about people who have whole dialogues by just using voice mails. Again, this means that the dialogue is much more independent compared to a direct communication.

Another way of communicating via messages containing audio or voice information is the use of so-called Push-To-Talk (PTT) standards. PTT is a two-way communication service that works similar to a "Walkie Talkie". While a normal phone call is full-duplex meaning that both parties can hear each other at the same time, PTT communication is usually half-duplex meaning that the communication can only travel in one direction at any given moment. To control which person can speak and be heard, PTT requires the person speaking to press a button while talking and to release it afterwards. The listener then presses his button in order to respond. This way, the system knows which direction the signal should be travelling in.

Today's Push-To-Talk standards are generally built around using PTT for Walkie-Talkie-type communication, i.e. direct communication with the option of talking to several people at once using groups. When a user uses the PTT button to talk to a selected contact, the audio information is directly transferred to the other device and played back using the loudspeaker.

Nevertheless, sometimes people do not want to listen and/or answer to an incoming PTT voice message immediately, as they might—for example—be busy doing something else. Again, the asynchronous nature of an SMS communication is missed while using PTT communication. The current PTT standards do not support this type of asynchronous communication neither do the user interfaces in any PTT application available on the market.

SUMMARY

It is therefore an object of the present invention to provide a method for transferring a message containing audio and/or voice information wherein said method provides the advantages of an asynchronous communication.

According to a first aspect of the present invention, a method for transferring a message containing audio and/or voice information from a transmitting communication terminal to a receiving communication terminal is proposed wherein—depending on a setting of said receiving communication terminal—the message is either directly played back at the receiving communication terminal or temporarily stored in order to be played back at a later time point. Thus, depending on the preferences of the user of the receiving communication terminal, the message—which is preferably transmitted as a PTT message—is either directly played back if the receiver prefers a direct communication or temporarily stored if the receiver prefers an asynchronous communication. The communication method of the present invention therefore combines the advantages of a direct PTT communication with the advantages of an asynchronous communication. Preferably, the audio or voice information is stored as a Multimedia Message Service (MMS) voice message in case the receiver prefers an asynchronous communication.

Similar to all known communication systems, the message transferred from the transmitting communication terminal is preferably transferred via a communication network comprising at least one communication server. In this case, there are two possibilities for treating incoming PTT messages.

According to a first embodiment of the present invention, the information how the receiving communication terminal wants or needs to treat an incoming message is transmitted to or already present at the communication server of the network. In this case, the communication server either directly forwards the voice message to the receiving communication terminal or temporarily stores the message, e.g. in case it has been informed that the user of the receiving communication terminal prefers an asynchronous communication or in case that the receiving communication terminal does not support PTT but only MMS messages. The server then preferably converts the incoming PTT audio message into an MMS voice message and forwards it to the receiving communication terminal where the message can be played back whenever the user finds it convenient. Alternatively, the server can also only forward a text message to the receiving communication terminal informing that an MMS voice message has been stored and can be downloaded.

In a second embodiment of the present invention the server of the communication system does not treat the audio message depending on an information received from the receiving communication terminal. In this case, the audio message is always directly transferred to the receiving communication terminal. Depending on the settings of this communication terminal, the incoming message is either immediately played back in the loudspeaker or again temporarily stored as an MMS file and played back at a time the user finds it convenient. In both embodiments, the user of the receiving communication terminal can freely choose whether he prefers a direct or an asynchronous communication.

In accordance with the present invention, also a communication terminal for receiving messages containing audio and/or voice information is provided wherein said communication terminal is adapted to either directly play back an incoming message or to temporarily store said message for playing it back at a later time point. Further, a communication system comprising a transmitting communication terminal for transferring a message containing audio and/or voice information and a receiving communication terminal for receiving said message is provided wherein depending on a setting of said receiving communication terminal said message is either directly played back at said receiving communication terminal or temporarily stored and played back at a later time point.

BRIEF DESCRIPTION OF THE DRAWINGS

In the following, the present invention will be described in more detail with reference to the accompanying drawings in which.

DETAILED DESCRIPTION OF EMBODIMENT

Figure 1:
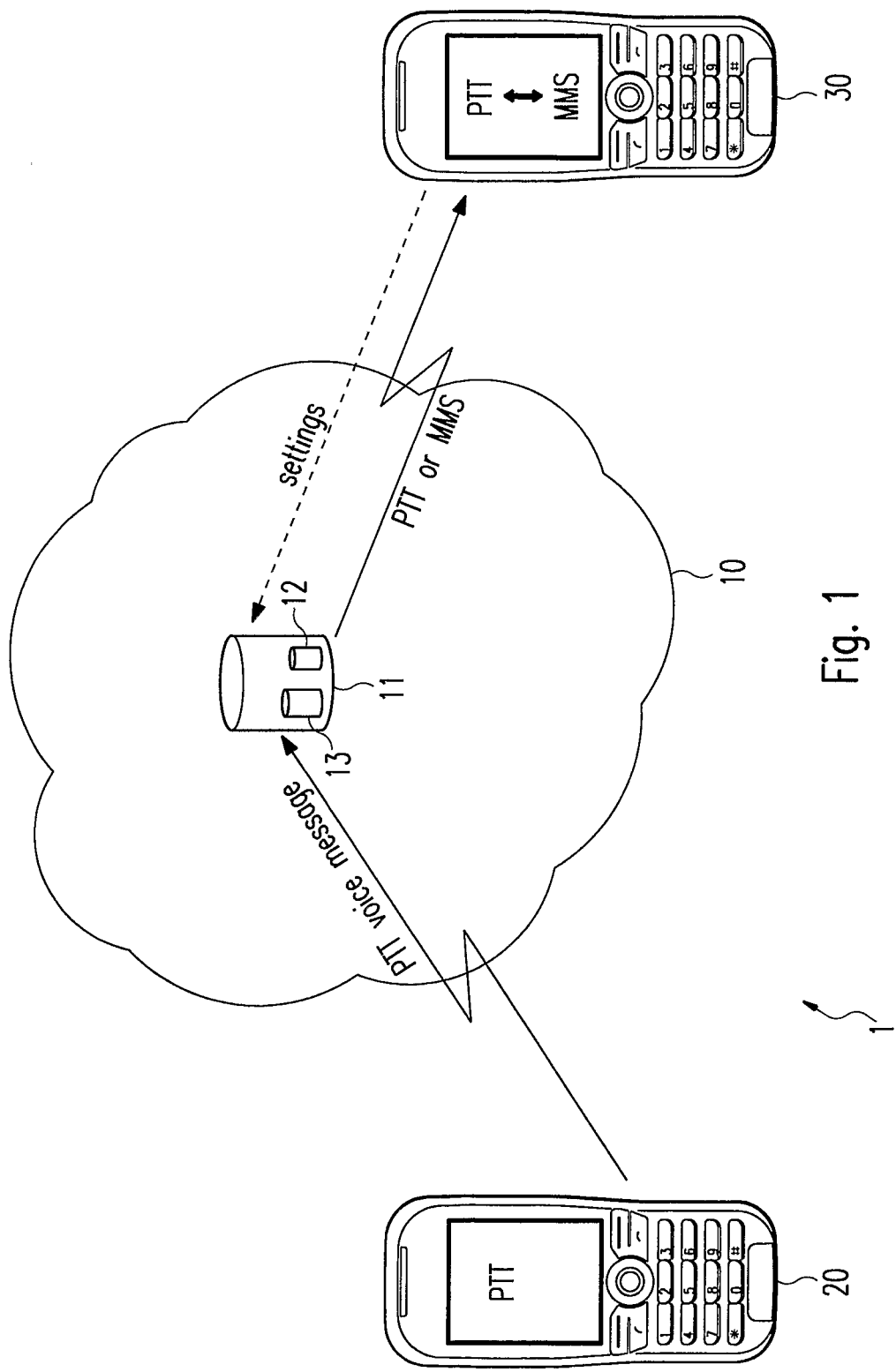
FIG. 1 is a schematic view of a communication system in accordance with the present invention.

As schematically shown in FIG. 1, the communication system 1 of the present invention comprises as a main element a communication network 10 which is adapted to transfer messages between several communication terminals that can be connected to the network 10. In a preferred embodiment of the present invention, the communication network 10 allows a wireless communication between the different communication terminals. The transfer of messages via the network 10 is controlled by a server 11 which forms a central element of the network 10.

In the embodiment shown in FIG. 1, two communication terminals 20 and 30 are connected to the communication network 10 and are therefore able to exchange messages comprising audio and/or voice information. In particular, the communication terminals 20 and 30 could be formed by mobile phones allowing a wireless communication. However, also other communication devices being able to be connected the communication network 10 could be used.

Usually, both communication terminals 20 and 30 would communicate with each other via a normal cell phone wherein the communication link provided by the network 10 is full-duplex. This means, that the users of both mobile phones 20 and 30 can talk and hear each other at the same time.

The communication system in accordance with the present invention, however, provides an additional or alternative way to communicate wherein messages comprising audio and/or voice information are transferred via a half-duplex communication link, meaning that communication can only travel in one direction at a given moment. While such a PTT communication is also known in the prior art, the system in accordance with the present invention provides additional features that allow the user of the system to decide whether the communication should be direct or asynchronous. In particular, the user of the receiving communication terminal decides whether the communication will be direct or asynchronous.

FIG. 1 shows the case wherein the user of the first communication terminal 20 wants to transfer a PTT voice message via the communication network 10 to the receiving communication terminal 30. In a classical Push-To-Talk communication the voice message would be directly transferred to the receiving communication terminal 30 and immediately played back there via the loudspeaker of the receiving communication terminal 30. This would also be the case in the system according to the present invention in case that the user of the receiving communication terminal 30 has decided that he prefers a direct PTT communication.

However, it might be the case that the user of said receiving communication terminal 30 does not want to listen or answer to an incoming voice message immediately since he might be busy by doing something else. Also, the receiving terminal might not support PTT but only MMS or even only SMS In this case, the voice message transmitted from the transmitting communication terminal 20 is not directly played back but temporarily stored such that the user of the receiving communication terminal 30 is free to decide when he wants to listen to the message. In this way, an asynchronous communication is achieved.

The asynchronous communication mentioned above can be realized in two different ways.

In the first embodiment—which is shown in FIG. 1—the treatment of an incoming voice message in accordance with the preferences of the user of the receiving communication terminal 30 takes place at the server 11 of the communication network 10. In this case, it is necessary that the server 11 knows whether the user of the receiving communication terminal 30 prefers a direct or an asynchronous communication. Thus, a corresponding information is transmitted from the receiving communication terminal 30 to the server 11 and stored there in a corresponding memory 12. Depending on the information stored in said memory 12, the server handles the voice mail transmitted by the first communication terminal 20 in different ways. In case the user of the receiving communication terminal 30 has decided that he prefers a direct communication, the incoming PTT voice message is directly forwarded by the server 11 to the receiving communication device 30 and played back there via the loudspeaker contained in the terminal 30. However, in case the user of the receiving communication terminal 30 prefers an asynchronous communication, the PTT voice message transferred by the transmitting communication device 20 is converted into an MMS voice message and temporarily stored by the server 11. Thus, the server 11 comprises an additional storing means 13 for storing such converted MMS messages. Further, the receiving communication terminal 30 is informed that an MMS voice message has been stored and can be called up whenever the user of the receiving communication device 30 wants. The user of the receiving terminal 30 is now free to decide when he wants to listen to the voice message and when he wants to reply to it. In this way, the preferred asynchronous communication is obtained. The later case also applies to the situation in which the receiving terminal does not support PTT and the server 11 has received or detected corresponding information.

It has to be mentioned that it is not absolutely necessary that the storing of the converted MMS message takes place at the server 11. Alternatively, the MMS message could also immediately be transmitted to the receiving communication terminal 30 and be stored there. In both cases the user of the receiving communication terminal 30 is free to decide when he wants to listen to the message.

In the embodiment explained with reference to FIG. 1, the treatment of the PTT voice message in accordance with the preferences of the user of the receiving communication terminal 30 takes place at the server 11 of the communication network 10. However, it would also be possible that the treatment directly takes place at the receiving communication terminal 30. In this case, the PTT voice message transferred by the first communication terminal 20 is always directly forwarded by the network 10 to the receiving communication terminal 30. However, again in accordance with the option chosen by the user of the receiving communication terminal 30 the message is either directly play backed via the loudspeaker or temporarily stored as an MMS file in order to be played back whenever the user of the terminal 30 finds it convenient. Again, the user of the terminal is able to set up a direct or an asynchronous communication in accordance with his actual preferences.

Figure 2:
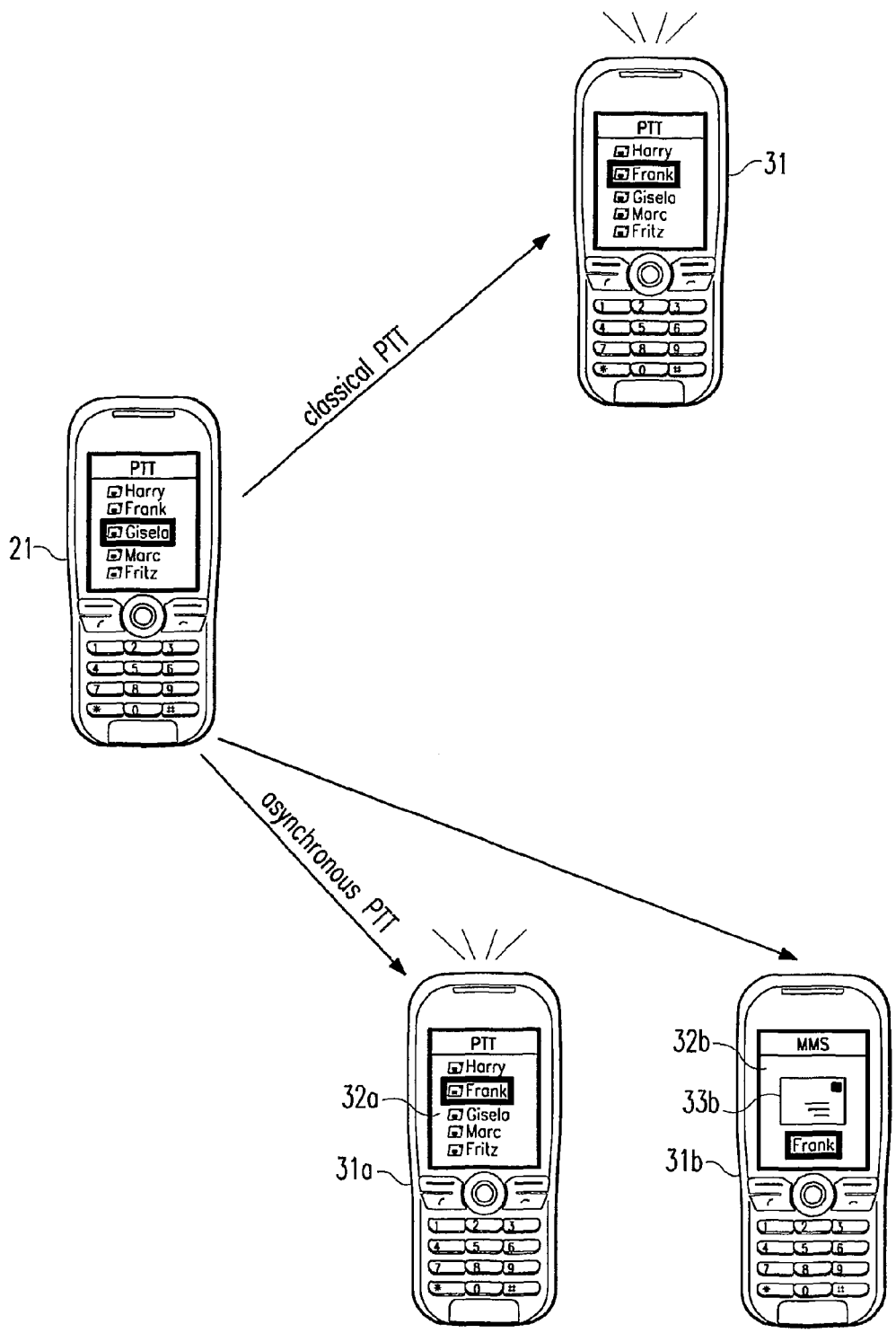
FIG. 2 shows the differences between a direct PTT communication as known in the prior art and the communication method of the present invention.

The advantages of the present invention over an ordinary PTT communication are summarized in FIG. 2. In the upper half of FIG. 2, an ordinary PTT message is transmitted from a first mobile phone 21 to a second mobile phone 31. As soon as the voice message is received by the second mobile phone 31, the phone 31 starts playing back the message and a direct communication between both phones 21 and 31 is obtained.

The lower half of FIG. 2 shows the behavior of the receiving mobile phone in accordance with the present invention. In the case shown left, the user of the mobile phone 31a has decided that he prefers a direct communication. Similar to the case shown above, an incoming PTT voice message is treated like an instant message and the audio message is directly play backed by the phone 31a. Furthermore, on the display 32a of the phone 31a an icon is shown next to the contact in the PTT application informing on the originator of the incoming message.

In case, however, the user of the receiving mobile phone 31b prefers an asynchronous communication, the incoming PTT message is treated like an MMS message. Now, the message is temporarily stored (either by the server of the communication network or by the phone 31b itself) and the user interface being usually used by incoming MMS messages is activated. On the display 32b of the phone 31b an icon 33b informing on the receipt of an MMS message as well as the name of the originator of this message are shown.

The present invention therefore gives users the ability to choose if they want PTT messages to be played back directly when received or if messages should be stored and only show up as an incoming MMS message next to the person who send it in the user interface. The user is therefore free to decide in which way he wants to communicate with other persons.

The invention claimed is:

1. A method for transferring a PTT message from a transmitting communication terminal to a receiving communication terminal, the method including:
   selecting at the receiving communication terminal a communication format a user of the receiving communication terminal prefers to receive,
   transmitting information regarding the communication format from the receiving communication terminal to at least one communication server informing the server about whether the user of the receiving communication terminal prefers a direct PTT communication or an asynchronous MMS communication,
   storing the information comprising the communication format at the at least one server, and
   upon receipt of the PTT message at the at least one server from the transmitting communication terminal:
      accessing the stored information comprising the communication format,
      determining whether the user prefers a direct PTT communication or an asynchronous MMS communication, and
      directly forwarding the PTT message to the receiving communication terminal to directly play back the message if the information indicates a user preference for direct communication, or
      temporarily storing the PTT message at least one of the server or the receiving communication terminal as an MMS voice message to be played back at a later time point if the information indicates a user preference for asynchronous communication.

2. The method of claim 1, wherein the message is transferred via a communication network comprising the at least one communication server.

3. The method of claim 2, wherein the message is temporarily stored at said communication server.

4. The method of claim 1, wherein the message is temporarily stored at said receiving communication terminal.

5. The method of claim 1, wherein the message is transferred from said transmitting communication terminal as a PTT message.

6. The method of claim 1, wherein at least one of the communication terminals is a mobile communication terminal.

7. The method of claim 6, wherein said mobile communication terminal is a mobile phone.

8. The method of claim 1, wherein temporarily storing the PTT message comprises: automatically converting the PTT message into the MMS voice message if the information indicates a user preference for asynchronous communication.

9. A communication system comprising:
   a transmitting communication terminal for transferring a PTT message,
   a receiving communication terminal for receiving said message, the receiving communication terminal being configured to select a communication format a user of the receiving communication terminal prefers to receive and to transmit information regarding the communication format to at least one communication server informing the server about whether the user of the receiving communication terminal prefers a direct PTT communication or an asynchronous MMS communication, and
   the at least one communication server configured to store the information comprising the communication format,
   wherein upon receipt of the PTT message at the at least one server, the server is configured to access the stored information comprising the communication format, determine whether the user prefers a direct PTT communication or an asynchronous MMS communication, and directly forward the PTT message to the receiving communication terminal to directly play back the message if the information indicates a user preference for direct communication, or temporarily store the PTT message at least one of the server or the receiving communication terminal as an MMS voice message to be played back at a later time point if the information indicates a user preference for asynchronous communication.

10. The communication system of claim 9, further comprising a communication network with the at least one communication server for forwarding the message.

11. The communication system of claim 10, wherein the message is temporarily stored at said communication server.

12. The communication system of claim 9, wherein the message is temporarily stored at said receiving communication terminal.

13. The communication system of claim 9, wherein the message is transferred from said transmitting communication terminal as a PTT message.

14. The communication system of claim 9, wherein at least one of the communication terminals is a mobile communication terminal.

15. The communication system of claim 14, wherein said mobile communication terminal is a mobile phone.

16. The communication system of claim 9, wherein the server is configured to automatically convert the PTT message into the MMS voice message if the user prefers an asynchronous communication format.

\* \* \* \* \*

UNITED STATES PATENT AND TRADEMARK OFFICE
CERTIFICATE OF CORRECTION

PATENT NO.         : 8,682,360 B2                                          Page 1 of 1
APPLICATION NO.    : 11/816012
DATED              : March 25, 2014
INVENTOR(S)        : Simon Lessing It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 661 days.

Signed and Sealed this
Twenty-ninth Day of September, 2015

Michelle K. Lee
*Director of the United States Patent and Trademark Office*